United States Patent [19]

Hanabusa

[11] Patent Number: 4,734,804

[45] Date of Patent: Mar. 29, 1988

[54] MAGNETIC HEAD DRIVING MECHANISM FOR A MAGNETIC DISK DRIVE

[75] Inventor: Shuichi Hanabusa, Tokyo, Japan

[73] Assignee: NEC Corporation, Tokyo, Japan

[21] Appl. No.: 706,422

[22] Filed: Feb. 27, 1985

[30] Foreign Application Priority Data

Feb. 27, 1984 [JP] Japan .................. 59-35525

[51] Int. Cl.⁴ ........................... G11B 5/54; G11B 5/55
[52] U.S. Cl. .................... 360/104; 360/105; 360/106
[58] Field of Search .................. 360/104–106; 310/49 R

[56] References Cited

U.S. PATENT DOCUMENTS 3,286,109 11/1966 Madsen ........................... 310/49 R
3,389,277 6/1968 Fiore ............................. 310/49 R
4,161,004 7/1979 Dalziel ......................... 360/109 X
4,164,769 8/1979 Kaseta et al. .................. 360/97 X
4,194,226 3/1980 Kaseta et al. ................... 360/106
4,234,899 11/1980 Feldstein et al. ................. 360/73
4,308,564 12/1981 Thompson ....................... 360/99

Primary Examiner—Stuart N. Hecker
Assistant Examiner—Alyssa H. Bowler
Attorney, Agent, or Firm—Sughrue, Mion, Zinn, Macpeak & Seas

[57] ABSTRACT

A damped magnetic head driver for a stepping motor driver. A damper is attached to a shaft of the stepping motor. A lightweight sealed housing of the damper is rigidly attached to the shaft and contains a hollow portion. A heavy flywheel is fitted in the hollow and is supported on the shaft by ball bearings. A viscous fluid fills the remainder of the hollow. In a further improvement, a circumferential surface of the damper housing has a series of teeth that are engaged by a plunger when power to the disc drive is interrupted.

10 Claims, 6 Drawing Figures

MAGNETIC HEAD DRIVING MECHANISM FOR A MAGNETIC DISK DRIVE

BACKGROUND OF THE INVENTION

The present invention relates to a structure of a magnetic disk drive, and in particular to a magnetic head driving mechanism for an air bearing head slider.

The magnetic disk drive of this kind employs an air bearing head slider. The head slider closely follows a rotating disk surface at a constant spacing owing to the air flow caused by rotation of the disk in its recording or reproducing operation. On the other hand, the head slider contacts the disk surface while the disk is stopped. A suspension arm supports the head slider and is mounted on a carriage for moving the head slider in the radial direction of the magnetic disk. A stepping motor mechanically engages the carriage for positioning the head at a target track on the surface of the rotating disk. In the recording or reproducing operation, the head slider is rapidly accelerated and decelerated for radially accessing different data tracks and is stopped on the target track on the rotating disk surface.

In this head driving mecnanism, when the head stops on the target track, the head slider oscillates in the radial direction due to the inertial force of the head driving mechanism. Therefore, a considerable period is required to dampen the oscillation of the head. This oscillatory period is included in the access time of the disk drive. In other words, the disk drive cannot record or reproduce the data on the magnetic disk during the oscillatory period. Accordingly, the oscillation of the head should be damped as fast as possible in order to shorten the access time of the disk drive.

To this end, a conventional disk drive employs an electric damping of the stepping motor of the head driving mechanism. In the manner of the electric damping, a damping pulse is supplied to the stepping motor immediately after the stepping pulse has been supplied for rotating the stepping motor in the accessing direction and the head has been positioned on the target track. The damping pulse has a relatively low voltage and gives the rotary force in the reverse direction to the accessing direction.

The electric damping can reduce the oscillatory period of the head to some degree but is insufficient to obtain further reduction of the oscillatory period. Further, the control for supplying the damping pulse to the stepping motor is complicated.

On the other hand, the magnetic disk of the disk drive of this kind has a circular CSS (Contact Start Stop) zone on its surface for contacting the head slider when the disk stops. The CSS zone is disposed on the outer or inner circumferences of the R/W (Read/Write) zone where the data is recorded. The disk drive positions the head on the CSS zone after recording or reproducing operation has finished, and then, stops the disk rotation.

This positioning operation for the head to the CSS zone is indicated by the program for the computer system including the disk drive. Therefore, each job program requires the steps for carrying out the positioning operation for the head to the CSS zone after the final step. However, some programmers often compose a job program that lacks the positioning operation steps and have the program executed by the computer system. In this case, the disk drive stops the disk rotation with the head positioned on the R/W zone. Therefore, the head slider gradually falls and contacts the disk surface in the R/W zone in response to the decrease of the rotating speed of the disk, and finally, contacts the disk surface. In this state, if the head slider moves in the radial direction, the R/W zone of the disk surface is rubbed in the radial direction by the head slider and the R/W zone is damaged, i.e., "head crash" is occurred.

Similarly, the head slider rubs the R/W zone in the radial direction of the disk when the power supply to the disk drive is stopped by a power interruption while the disk drive is in a recording or reproducing operation.

Furthermore, when the disk drive is shipped, the head is positioned on the CSS zone. However, the head slider may move in the radial direction the disk and rub the R/W zone owing to considerable shock inflicted on the disk drive during the shipment. The "head crash" effect also occurs in this case.

The inventor of the present invention proposed a locking mechanism for a head driving mechanism disclosed in Japanese Utility Model Application No. 37002/1983. In this mechanism, a lever means engageable to the rotary axis of the stepping motor is provided for preventing the stepping motor from rotating while the disk drive is shipped. However, since the lever means is operated by hand and the operating portion of the lever means is disposed on the outer surface of the disk drive housing, this locking operation requires excess labor and cannot be carried out in the situation that the disk drive is assembled within the housing of a computer system.

SUMMARY OF THE INVENTION

Therefore, an object of the present invention is to damp the oscillation of the magnetic head in the radial direction of the disk when the head slider is positioned at a target track.

Another object of the present invention is to prevent the magnetic head from moving in the radial direction of the disk while the rotation of the disk is stopped for preventing a "head crash".

According to the present invention, there is provided a magnetic head driving mechanism comprising a carriage for mounting a magnetic head assembly and slidable in the radial direction of a disk, a stepping motor having a rotary shaft engaging the carriage for moving the head assembly in the radial direction of the disk, a damper secured to the rotary shaft of the stepping motor to rotate together with the rotary shaft and having a sealed cylindrical hollow portion formed around the rotary shaft in the damper, a cylindrical inertial mechanism provided in the hollow portion of the damper and rotatable around the rotary axis of the stepping motor in the damper, and a viscous fluid impregnated in the hollow portion of the damper.

Further, in the present invention, the damper has a friction surface formed around its outer circumferential surface, and the head driving mechanism further has means for engaging the friction surface to prevent the rotation of the stepping motor in response to a stop of rotation of the magnetic disk.

BRIEF DESCRIPTION OF THE DRAWINGS

The above-mentioned and other objects, features and advantages of the present invention will be better understood from the following detailed description of a preferred embodiment taken in conjunction with the accompanying drawings, wherein.

DESCRIPTION OF THE PREFERRED EMBODIMENT

Figure 1:
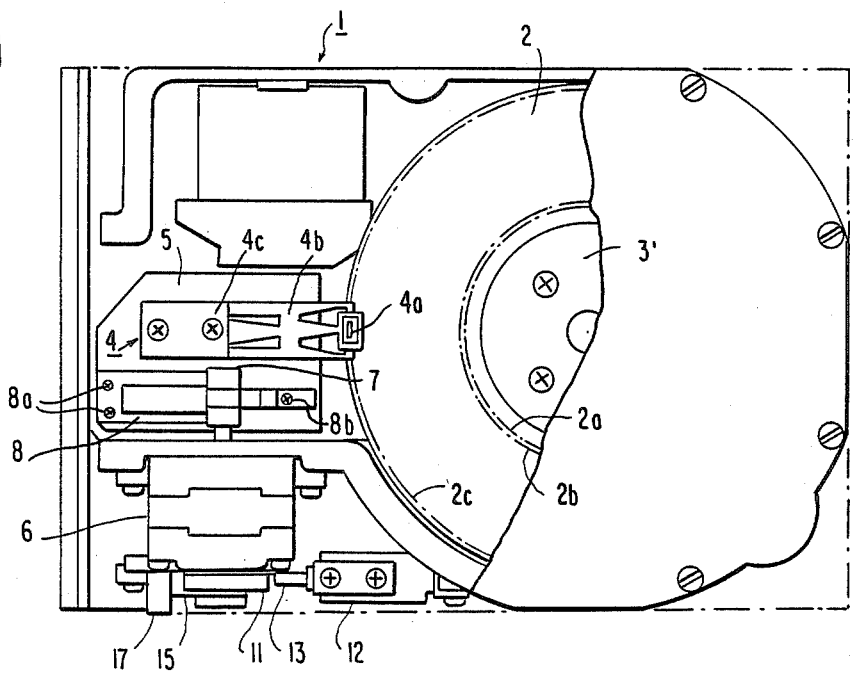
FIG. 1 is a cross-sectional plan view of a magnetic disk drive according to an embodiment of the present invention.
Figure 2:
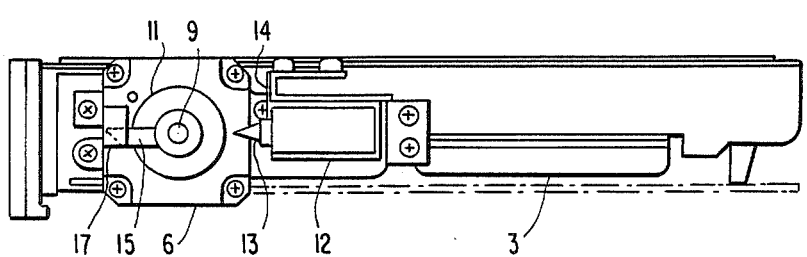
FIG. 2 is a side view of the magnetic disk drive shown in FIG. 1.

Referring to FIGS. 1 and 2, a magnetic disk drive 1 of the preferred embodiment comprises magnetic disks 2 (only the upper disk is illustrated), a driving motor 3 for rotating the magnetic disks 2, a magnetic head assembly 4 mounted on a carriage 5, and a stepping motor 6 for moving the carriage 5 in the radial direction of the disks 2.

A plurality of the disks 2 are held by a common spindle 3' and are piled in parallel with a constant spacing in their rotary axis direction. The rotary shaft of the driving motor 3 is secured to the central hole of the spindle 3'.

The magnetic head assembly 4 has a plurality of magnetic heads 4a corresponding to the disk surfaces. Each of the magnetic heads 4a is supported by a suspension element 4b and urged in the direction to contact the respective disk surface. The suspension elements 4b are integrally connected to a rigid arm section 4c. The carriage 5 mounts the head assembly 4 and can slide in the radial direction of the disk 2 (i.e., leftward and rightward in the drawings). A pulley 7 is secured to one end of the rotary shaft 9 of the stepping motor 6. A steel band 8 is wound in one turn around the pulley 7 and fixed to the pulley 7 at its longitudinally central portion. Both ends of the steel band 8 are fixed to the carriage 5 by screws 8a and 8b. The rotation of the stepping motor 6 enables the carriage 5 to move in the radial direction of the disk 2. Accordingly, the magnetic heads 4a move to radially access different data cylinders on the surfaces of the magnetic disks 2 in response to the rotational angle of the stepping motor 6.

Each of the magnetic disks 2 has a CSS zone 2a on the inner circumferential surface of the disk 2 and a R/W zone extending from a circumference 2b outside the CSS zone to a circumference 2b to 2c on the outer circumferential surface. When the rotation of the disk 2 stops, the magnetic head 4a is positioned on the CSS zone 2a and contacts the disk surface. When the disk 2 rotates, the magnetic head 4a floats and keeps a constant flying clearance away from the disk surface. In this state, the magnetic head 4a is initially positioned on the O track 2c (the outermost circumferential track in the R/W zone) and, then, positioned on a target track to record or read the data.

In order to move the magnetic head by a desired distance, an appropriate number of stepping pulses are supplied to the stepping motor 6. The stepping motor 6 rotates by the rotary angle corresponding to the number of the stepping pulses. When the stepping motor 6 stops, the shaft 9 oscillates a little in the rotary direction owing to the rotary inertial force of the rotor and the shaft 9 of the stepping motor 6. This oscillation is transmitted to the carriage 5 and suspension element 4b, with the result that the magnetic head 4a also oscillates over the target track in the radial direction of the disk before the head 4a is finally positioned on the target track.

Figure 3:
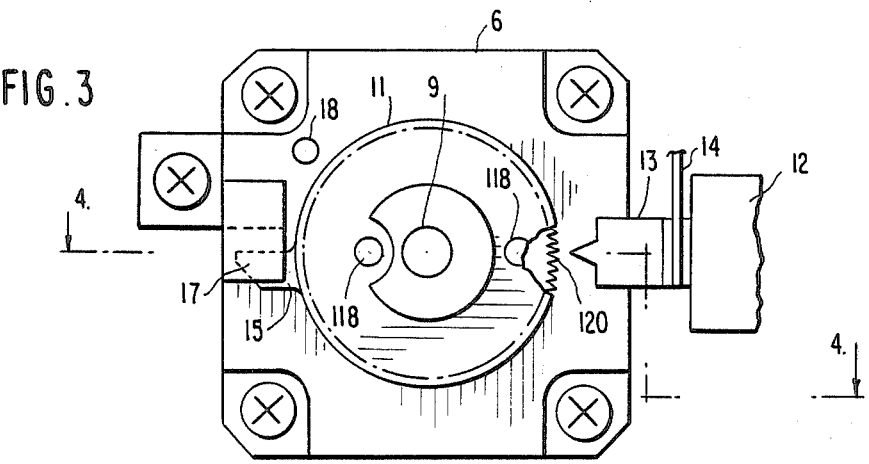
FIG. 3 is a side view of a damper used for the magnetic disk drive shown in FIG. 1.
Figure 4:
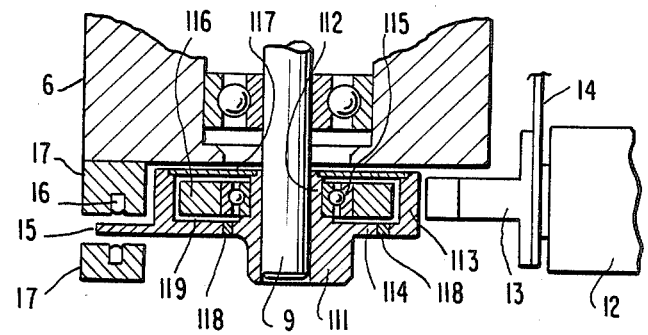
FIG. 4 is a cross-sectional view of the damper shown in FIG. 3.
Figure 5:
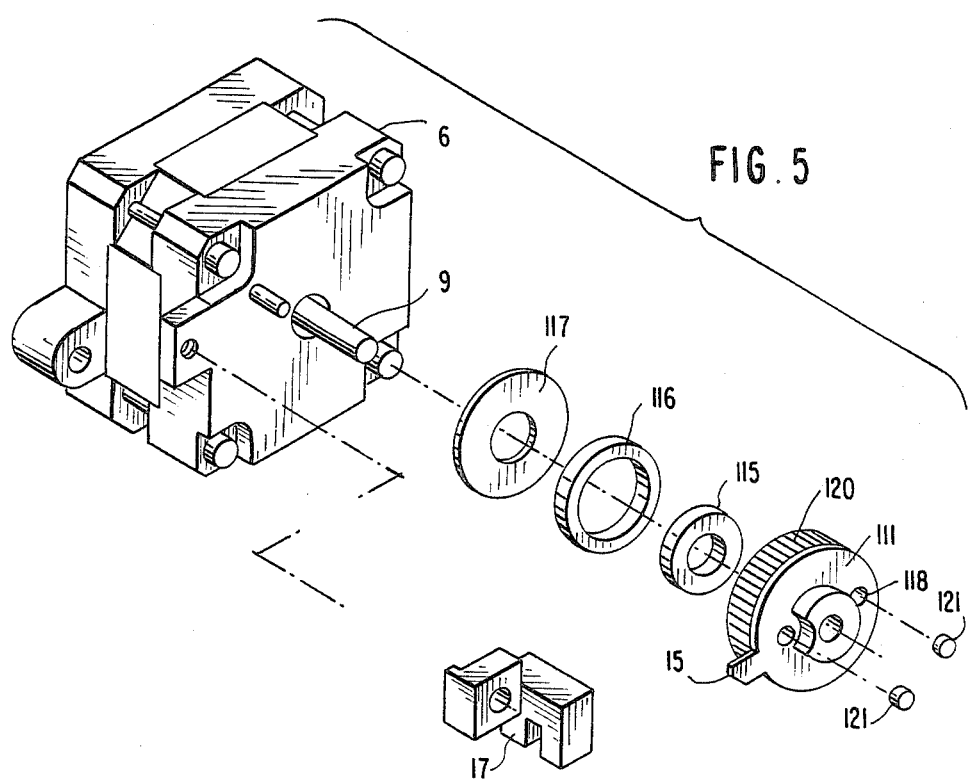
FIG. 5 is a perspective view of the damper shown in FIG. 3.

To reduce the oscillation, a damper mechanism 11 is provided at the second or other end of the rotary shaft 9. As shown in FIGS. 3, 4 and 5, the cylindrical damper mechanism 11 has a damper housing 11 including a hub section 112, an outer circumferential wall 113 and a circular radial wall 114. In the damper housing 111, a circular hollow portion is formed around the hub section 112. The housing 111 is fixedly secured to the rotary shaft 9 at the hub section 112. The damper housing 111 is made of light material, for instance, plastics are employed.

A circular ball bearing 115 is secured to the outer circumferential surface of the hub section 112, and rotatably supports a circular inertial flywheel 116 in the hollow portion of the housing 111. Namely, the inertial flywheel 116 can rotate in the housing 111 around the hub section 112. The inertial flywheel 116 is made of heavy material having a high inertial moment, for instance, brass is employed.

A circular cover 117 is fixedly secured to the opening of the damper housing 111 to seal the hollow portion. Further, two pouring holes 118 are formed through the circular wall 114. Viscous fluid 119 is poured through one of the holes 118 into the hollow portion of the damper housing 111. The hollow portion is filled up with the viscous fluid 119. The holes 118 are then closed by cap elements 121 after the fluid 119 has been poured. The viscous fluid 119 is required to have an appropriate coefficient of viscosity and invariability of viscosity with respect to changes in temperature. In this embodiment, silicon oil is employed as the viscous fluid 119.

A plurality of gear teeth 120 are formed around the outer circumferential surface of the outer wall 113 of the damper housing 111. A solenoid 12 having a movable plunger 13 is provided on the frame of the disk drive 1 such that the working end of the plunger 13 faces the outer wall 113 (see FIGS. 1 and 2). A leaf spring 14 is secured to the plunger 13 so as to protrude and engage the plunger 13 to the outer wall 113. When the driving current to the solenoid 12 is stopped, the plunger 13 is protruded from the solenoid housing by the spring 14 and engages one of the gear teeth 120. Namely, the plunger 13 prevents the stepping motor 6 from rotating. When the solenoid 12 is excited, the plunger 13 is withdrawn into the solenoid housing and thus disengages the gear teeth 120. Accordingly, the stepping motor 6 can freely rotate.

A sensing arm 15 is integrally formed on the outer surface of the circular wall 114 of the damper housing 111. The sensing arm 15 rotates together with the damper mechanism 11, i.e, the rotary shaft 9 of the stepping motor 6. An index sensor 16 comprising an optical sensor is supported on the outer housing of the stepping motor 6 by a supporting element 17. The index sensor 16 detects the index rotary position of the shaft 9 of the stepping motor 6. That is, when the sensing arm 15 is positioned opposite to the sensor 16, an index signal is obtained from the sensor 16. In this state, the magnetic head 4a is positioned on the O track 2c.

The supporting element 17 has a U-shaped vertical section for preventing excessive rotation of the stepping motor 6 in the clockwise direction, as shown in FIGS. 3 and 5. Namely, when the stepping motor 6 exessively rotates in the clockwise direction, the sensing arm 15 runs against the supporting element 17, and then, the stepping motor 6 is stopped. Similarly, a stud 18 is provided on the outer housing of the stepping motor 6 for preventing excessive rotation of the motor 6 in the counter-clockwise direction. Accordingly, the stepping motor 6 can rotate within the rotational range defined by the supporting element 17 and the stud 18.

Figure 6:
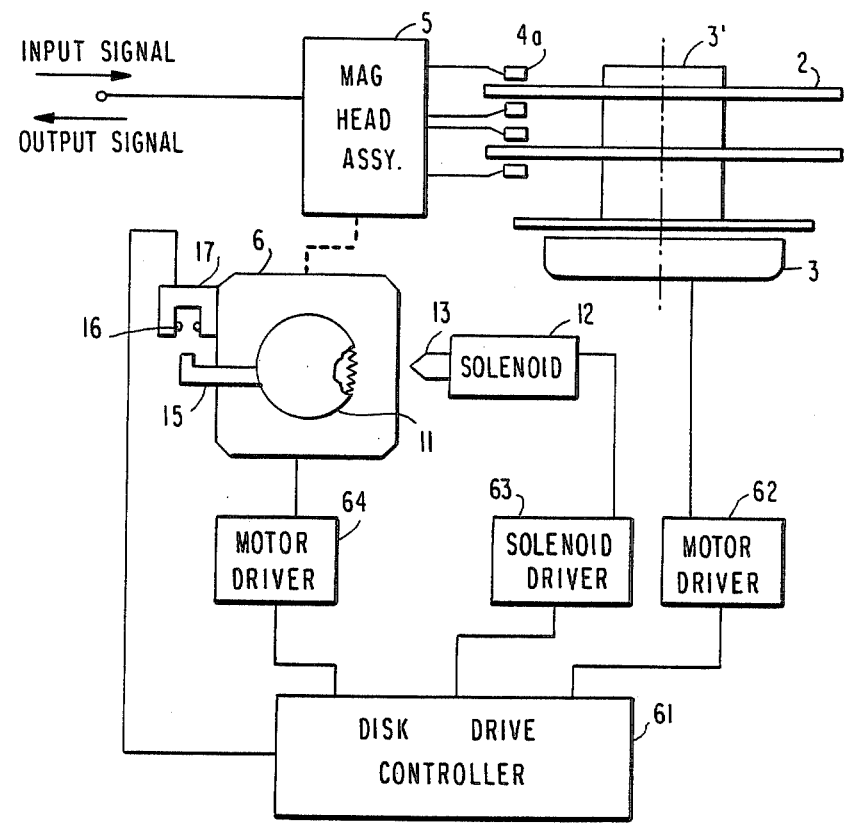
FIG. 6 is a block diagram illustrating the operation control of the magnetic disk drive shown in FIG. 1.

The operation of the disk drive 1 will be described hereinafter with reference to FIG. 6.

When the disk drive 1 is not working, the driving motor 3 stops and the heads 4a contacts the surface of the disks 2 within the CSS zone 2a. Further, the solenoid 12 is not excited and the plunger 13 engages the damper mechanism 11 to thereby stop the rotation of the stepping motor 6. Therefore, moving of the heads 4a in the radial direction of the disk 2 is prevented.

When the disk drive 1 starts, a disk controller 61 drives the driving motor 3 via a motor driver 62. Simultaneously, the controller 61 excites the solenoid 12 via a solenoid driver 63 to disengage the plunger 13 from the damper means 11. The heads 4a gradually separate from the disk surface owing to the rotation of the disk 2. Next, the disk controller 61 rotates the stepping motor 6 in the clockwise direction in FIG. 3 until the index signal is obtained from the index sensor 16. At this time, the heads 4a are positioned on the O tracks (O cylinder).

Next, the disk controller 61 supplies an appropriate number of the stepping pulse to the stepping motor 6 via a stepping motor driver 64. The stepping motor 6 rotates in the counter-clockwise direction by the certain rotary angle according to the number of the stepping pulses. Therefore, the carriage 5 is moved in the radial direction of the disk 2 and the head 2a is positioned on a target track. This recording or reproducing operation on the target track has been finished, the head 4a is moved in the radial direction of the disk 2 to be positioned on the next target track by rotation of the stepping motor 6 in the clockwise or counter-clockwise direction.

In this accessing operation, the stepping motor 6 is rapidly accelerated and decelerated in the rotary direction. When the stepping motor 6 is being accelerated, the inertial flywheel 116 tends remain stationary despite the rotation of the damper housing because of the inertia of the flywheel 116. Therefore, the inertial flywheel 116 supplies a damping force to the damper housing 111, i.e., to the rotary shaft 9 via the viscous fluid 119. When the stepping motor 6 is being decelerated to a stop, the inertia flywheel 116 tends to keep on rotating due to its inertia. The inertia flywheel 116 thus supplies a damping force in the rotary direction opposite to the direction of deceleration. This damping force is supplied to the rotary shaft 9 via the viscous fluid 119 and the damper housing 111. Namely, an appropriate friction force is applied to the rotary shaft 9 when the stepping motor 6 is stopped. Therefore, the oscillation of the rotary shaft 9 in the rotary direction is rapidly reduced by the damper means 11. As a result, the oscillation period is reduced and the access time of the head 4a is shortened.

When the recording or reproducing operation has been finished, the heads 4a are positioned on the CSS zone 2a. Then, the disk controller 61 stops the rotation of the driving motor 3 and stops the exciting current to the solenoid 12 to protrude the plunger 13 toward the damper means 11. Therefore, the plunger 13 engages one of the teeth 120 to prevent the stepping motor 6 from rotating. Consequently, the heads 4a does not move in the radial direction of the disk 2.

When the power supply is interrupted to the disk drive 1 while the disk drive 1 is in recording or reproducing operation, the head 4a contacts the R/W zone 2b to 2c on the disk surface. However, the moving of the head 4a in the radial direction of the disk 2 is prevented since the exciting current to the solenoid 12 is also stopped. Accordingly, "head crash" due to the moving of the head 4a in the radial direction is prevented.

Similarly, when the disk drive 1 is shipped, the head 4a is securely positioned on the CSS zone 2a since the plunger 13 engages the teeth 120. Therefore, the head 4a does not rub the R/W zone 2b to 2c of the disk surface even if considerable shock is imposed on the disk drive 1.

As described above, according to the present invention, a stepping motor for driving the magnetic head has a damper means fixed on its shaft. Therefore, the oscillation of the rotary shaft of the stepping motor can rapidly be reduced, with the result that the oscillation of the magnetic head over a target track in the radial direction of the disk can be damped. Further, according to the present invention, engaging means are provided for preventing the rotation of the stepping motor in response to the rotational stop of the magnetic disk. Therefore, "head crash" is prevented when the disk drive is not working.

What is claimed is:

1. A magnetic disk drive equipped with a magnetic head positioning mechanism for positioning a magnetic head at a target track of a magnetic disk driven by a spindle motor, comprising:

a carriage for mounting said magnetic head, said carriage being movable in a radial direction of said magnetic disk;

a stepping motor for enabling said carriage to move in said radial direction so as to position said magnetic head at the target track, said stepping motor including a rotary shaft coupled to said carriage at one end;

damper means secured to the other side of said rotary shaft to rotate together with said rotary shaft, said damper means including a damper housing in which a sealed cylindrical hollow portion is provided around said rotary shaft, cylindrical inertia means provided rotatably around said rotary shaft in said hollow portion, viscous fluid being filled in said hollow portion, and friction means being provided on an outer surface of said damper housing; and stopper means disposed opposite to said outer surface of said damper housing, said stopper means having projection means able to project to said damper housing to engage said friction means and able to remove from said damper housing to disengage said friction means in response to the actuation of said stopper means, said projection means engaging said friction means of said damper housing to prevent rotation of said rotary shaft of said stepping motor when said spindle motor stops driving said magnetic disk, whereby said magnetic head and said carriage are prevented from moving in said radial direction of said magnetic disk when said magnetic disk is not driven, and said projection means disengaging said friction means of said damper housing to permit rotation of said rotary shaft of said stepping motor when said spindle motor drives said magnetic disk, whereby said magnetic head and said carriage are permitted to move in said radial direction of said magnetic disk when said magnetic disk is driven.

2. The magnetic disk drive as claimed in claim 1, said damper means further comprising a hub section secured to said rotary shaft and a ball bearing assembly secured to the outer circumference of said hub section, said inertia means being secured to the outer circumference of said ball bearing.

3. The magnetic disk drive as claimed in claim 1, wherein said viscous fluid is silicon oil.

4. The magnetic disk drive as claimed in claim 1, wherein said inertia means is made of brass.

5. The magnetic disk drive as claimed in claim 1, further comprising a sensing arm provided on said damper means, said sensing arm rotating together with said rotary shaft, and sensor means for detecting said sensing arm to recognize an index rotary position of said stepping motor.

6. A magnetic disk drive equipped with a magnetic head positioning mechanism for positioning a magnetic head at a target track of a magnetic disk driven by a spindle motor, comprising:

a carriage for mounting said magnetic head, said carriage being movable in a radial direction of said magnetic disk;

a stepping motor for enabling said carriage to move in said radial direction so as to position said magnetic head at the target track, said stepping motor including a rotary shaft coupled to said carriage at one end;

damper means secured to the other side of said rotary shaft to rotate together with said rotary shaft, said damper means including a damper housing in which a sealed cylindrical hollow portion is provided around said rotary shaft, cylindrical inertia means provided rotatably around said rotary shaft in said hollow portion, viscous fluid being filled in said hollow portion, and friction means being provided on an outer surface of said damper housing; and stopper means disposed opposite to said outer surface of said damper housing, said stopper means including a solenoid having an operable plunger and spring means for protruding said plunger, said plunger engaging said friction means of said damper housing to prevent rotation of said rotary shaft of said stepping motor when said spindle motor stops driving said magnetic disk and when said solenoid is not excited, whereby said magnetic head and said carriage are prevented from moving in said radial direction of said magnetic disk when said magnetic disk is not driven.

7. A magnetic disk drive equipped with a magnetic head positioning mechanism for positioning a magnetic head at a target track of a magnetic disk rotatably driven by a spindle motor, comprising:

a carriage for mounting said magnetic head, said carriage being movable in a radial direction of said magnetic disk;

a rotary motor for enabling said carriage to move in said radial direction so as to position said magnetic head at the target track, said rotary motor including a rotary shaft coupled to said carriage;

detent means fixedly secured to said rotary shaft, said detent means being provided with a friction means on its outer surface; and stopper means disposed opposite to said outer surface of said detent means, said stopper means having actuator means capable of engaging and disengaging said friction means of said detent means in response to the actuation of said stopper mens, said actuator means engaging said friction means of said detent means to disenable said rotary shaft to rotate when said spindle motor stops driving said magnetic disk, whereby said magnetic head holds its radial position on said magnetic disk, and said actuator means disengaging said friction means to enable said rotary shaft to rotate when said spindle motor drives said magnetic disk, whereby said magnetic head can move in said radial direction.

8. The magnetic disk drive as claimed in claim 7, wherein said friction means of said detent means comprises gear teeth formed on said outer surface of said detent means.

9. A magnetic disk drive equipped with a magnetic head positioning mechanism for positioning a magnetic head at a target track of a magnetic disk rotatably driven by a spindle motor, comprising:

a carriage for mounting said magnetic head, said carriage being movable in a radial direction of said magnetic disk;

a rotary motor for enabling said carriage to move in said radial direction so as to position said magnetic head at the target track, said rotary motor including a rotary shaft coupled to said carriage at one end;

detent means fixedly secured to the other end of said rotary shaft, said detent means being provided with a friction means on its outer surface; and stopper means disposed opposite to said outer surface of said detent means, said stopper means including a solenoid having an operable plunger and spring means for biasing said plunger to said friction means of said detent mens to prevent said rotary motor from rotating when said spindle motor stops driving said magnetic disk, whereby said magnetic head holds its radial position on said magnetic disk, said solenoid being excited to remove said plunger from said friction means when said spindle motor drives said magnetic disk.

10. A magnetic head positioning mechanism for positioning a magnetic head at a target track of a magnetic disk driven by a spindle motor, said magnetic head being floated from a surface of said magnetic disk with a flying clearance therebetween by an airflow caused by rotation of said magnetic disk, said magnetic head contacting said surface of said magnetic disk when said rotation of said magnetic disk is stopped, said magnetic head positioning mechanism comprising:

a carriage for mounting said magnetic head, said carriage being movable in a radial direction of said magnetic disk;

a stepping motor for enabling said carriage to move in said radial direction so as to position said magnetic head at the target track of said magnetic disk, said stepping motor including a rotary shaft coupled to said carriage at one end;

cylindrical damper housing fixedly secured to the other end of said rotary shaft to rotate together with said rotary shaft, said damper housing including a sealed cylindrical hollow portion disposed around said rotary shaft and teeth provided around an outer circumferential surface of said damper housing;

an inertial flywheel provided in said hollow portion, said flywheel being rotatable in said hollow portion, viscous fluid filling remaining parts of said hollow portion;

a solenoid including a plunger disposed opposite to said outer circumferential surface of said damper housing, said plunger being provided with a spring for enabling said plunger to engage said teeth of said damper housing to prevent said stepping motor from rotating, said plunger being disengaged from said teeth of said damper housing by exciting said solenoid, said solenoid being excited while said spindle rotates said magnetic disk, whereby said magnetic head is prevented from moving in said radial direction of said magnetic disk when said magnetic head contacts said surface of said magnetic disk.

* * * * *

UNITED STATES PATENT AND TRADEMARK OFFICE
CERTIFICATE OF CORRECTION

PATENT NO. : 4,734,804
DATED : March 29, 1988
INVENTOR(S) : Hanabusa

It is certified that error appears in the above-identified patent and that said Letters Patent is hereby corrected as shown below:

| | |
|---|---|
| COLUMN 1, LINE 24 | Delete "mecnanism" and insert --mechanism--; |
| COLUMN 2, LINE 14 | After "direction" insert --on--; |
| COLUMN 3, LINE 51 | Delete "2b to"; |
| COLUMN 4, LINE 8 | After "housing" delete "11" and insert --111--; |
| COLUMN 5, LINE 44 | After "tends" insert --to--; |
| COLUMN 8, line 8 | Delete "mens" and insert --means--; |
| COLUMN 8, LINE 41 | Delete "mens" and insert --means--. |

Signed and Sealed this

Third Day of January, 1989

Attest:

DONALD J. QUIGG

Attesting Officer

Commissioner of Patents and Trademarks